US006414766B1

(12) United States Patent
Vinel et al.

(10) Patent No.: US 6,414,766 B1
(45) Date of Patent: Jul. 2, 2002

(54) ATM SWITCHING MATRIX INCLUDING A PASSIVE OPTICAL CORE

(75) Inventors: Paul Vinel, Velizy; Pierre Parmentier, Saclay, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/414,314

(22) Filed: Oct. 7, 1999

(30) Foreign Application Priority Data

Oct. 8, 1998 (FR) .......................................... 98 12610

(51) Int. Cl.[7] ........................ H04B 10/00; H04B 10/12; H04B 10/20; H04B 10/207
(52) U.S. Cl. ...................... 359/117; 359/128; 359/139; 370/414; 370/416; 370/418
(58) Field of Search ................................. 359/123, 128, 359/139, 143, 154, 117; 370/236, 396, 412, 352, 359, 395.1, 395.2, 395.21, 395.32, 395.4, 414, 416, 418

(56) References Cited

U.S. PATENT DOCUMENTS

| | | | | |
|---|---|---|---|---|
| 4,417,334 A | * | 11/1983 | Gunderson et al. ..... | 340/825.01 |
| 4,834,483 A | * | 5/1989 | Arthurs et al. ............... | 359/121 |
| 4,873,681 A | * | 10/1989 | Arthurs et al. ............... | 359/121 |
| 5,301,055 A | * | 4/1994 | Bagchi et al. ............... | 359/117 |
| 5,303,078 A | * | 4/1994 | Brackett et al. ............. | 359/123 |
| 5,448,559 A | * | 9/1995 | Hayter et al. ................ | 370/398 |
| 5,539,559 A | * | 7/1996 | Cisneros et al. ............. | 359/117 |
| 5,594,723 A | * | 1/1997 | Tibi ............................. | 370/396 |
| 5,604,734 A | * | 2/1997 | Buhrgard ..................... | 359/117 |
| 5,757,771 A | * | 5/1998 | Li et al. ....................... | 370/235 |

OTHER PUBLICATIONS

Duan, G.–H, et al: "Analysis of ATM Wavelength Routing Systems by Exploring their Similitude with Space Division Switching" 1996 IEEE International Conference on Communications (ICC), Converging Technologies for Tomorrow's Applications, Dallas, Jun. 23–27, 1996, vol. 3, Jun. 23, 1996, pp. 1783–1787, XP000625113.

* cited by examiner

Primary Examiner—Jason Chan
Assistant Examiner—Agustin Bello
(74) Attorney, Agent, or Firm—Sughrue Mion, PLLC

(57) ABSTRACT

An ATM switching matrix has input ports, output ports and a passive optical core consisting of optical couplers. Each output port includes at least p optical receivers which are tuned to the same fixed wavelength which is specific to the output port. Each receiver has an input respectively connected to a port of one of the p couplers, a buffer having p inputs respectively connected to the outputs of the p receivers and an output connected to an output of the matrix. The matrix includes distributed allocation arrangements which control switching arrangements of each input port to connect, to k separate couplers, k respective input ports which at the time concerned are receiving k cells addressed to the same output port, k being less than or equal to p, and this operation being repeated for each output port.

2 Claims, 2 Drawing Sheets

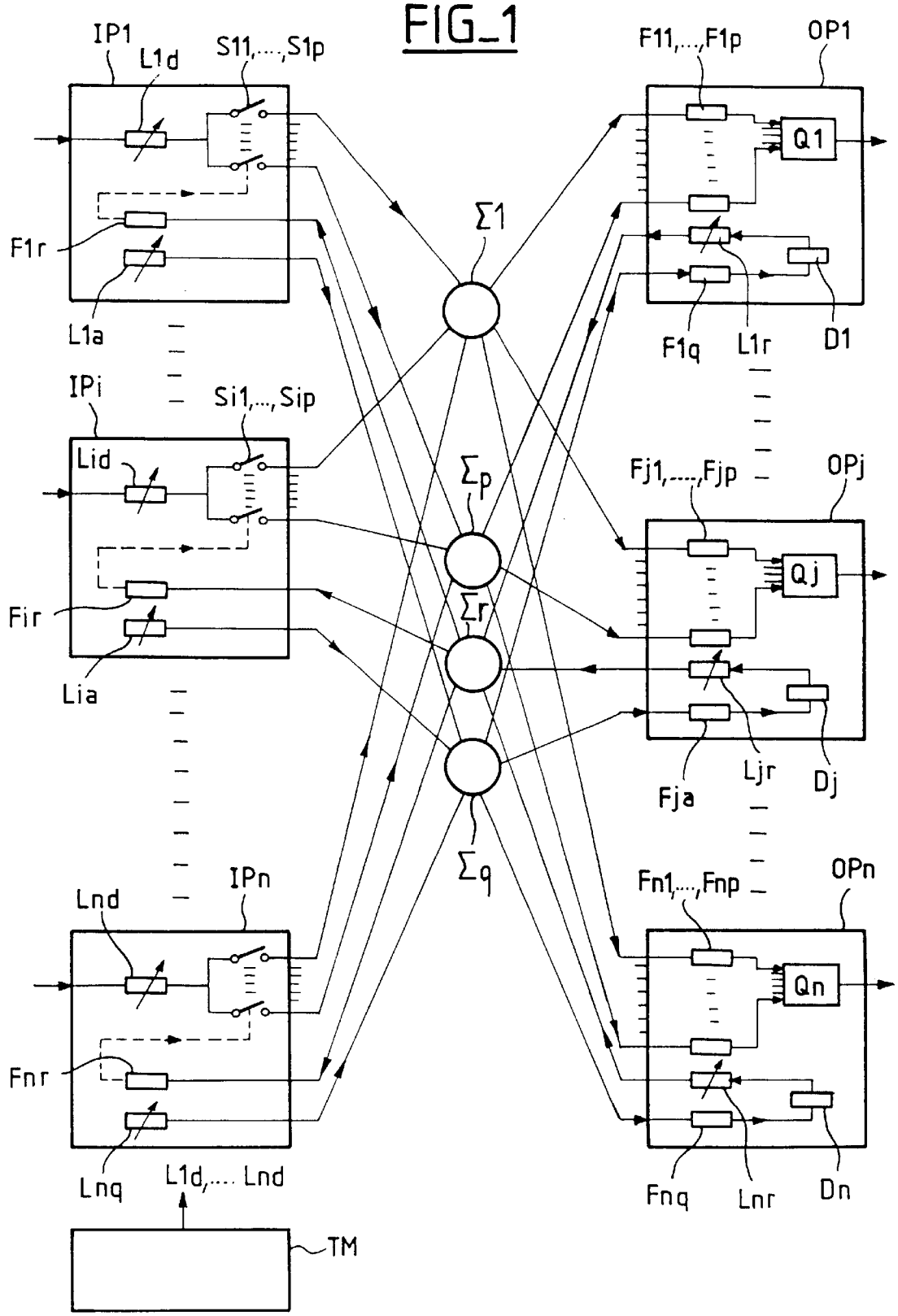

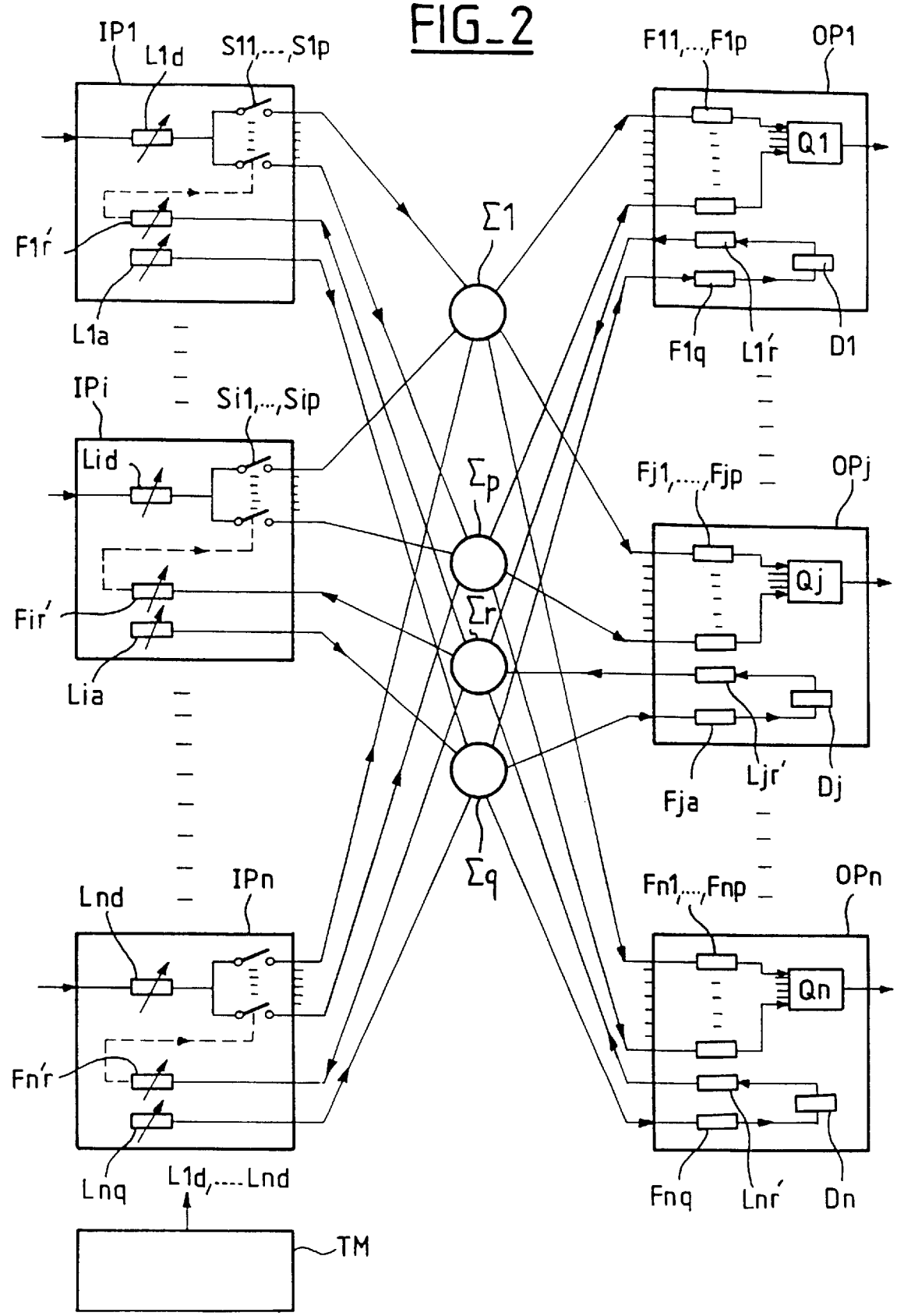
FIG_2

ATM SWITCHING MATRIX INCLUDING A PASSIVE OPTICAL CORE

BACKGROUND OF THE INVENTION

1. Field of the Invention

The invention concerns an ATM switching matrix including a passive optical core.

2. Description of the Prior Art

The drawback of prior art matrices of this type is that they include buffers in the form of sections of optical fiber for storing cells, exploiting the fact that signals take a certain time to propagate through them. These optical fiber sections are bulky. They therefore constitute a physical limit on the implementation of such matrices.

The aim of the invention is to remedy this drawback.

SUMMARY OF THE INVENTION

The invention consists in an ATM switching matrix having n input ports, a passive optical core and n output ports each having an electronic buffer, wherein:

each input port includes:
- an input coupled to an input of the matrix,
- at least p outputs, p being less than or equal to n,
- a tunable light source for emitting an optical signal transporting cells received at an input of the matrix,
- switching means for routing the optical signal emitted by the source to at least one of the p outputs of the input port, the matrix further includes tuning means for tuning the tunable light source of each input port so that its wavelength corresponds to the output of the matrix which is the destination of the cell currently being received by the input port concerned, the passive optical core includes at least p optical couplers each having 2n ports, n of which are respectively connected to an output of each of the n input ports, each output port includes:
- at least p optical receivers which are tuned to the same fixed wavelength which is specific to the output port, the receivers each having an input respectively connected to a port of one of the p couplers,
- a buffer having p inputs respectively connected to the outputs of the p receivers and an output connected to an output of the matrix, and the matrix includes distributed allocation means adapted to control the switching means of each input port to connect, to k separate couplers, k respective input ports which are receiving at the time concerned k cells addressed to the same output port, k being less than or equal to p, this operation being repeated for each output port.

The above matrix avoids the use of optical delay lines because cells are stored at the output ports in electronic buffers, combined with efficient routing by optical means coupling the input ports to the output ports. These optical means comprise optical switches, tunable lasers, filters and passive couplers, provide high transmission speeds and do not alter the sequencing of the cells. Using p passive couplers enables up to p cells to be transmitted to the same output port during the same cell period. The cell loss rate due to contention can be reduced as much as may be required by increasing the value of p.

In one preferred embodiment, the allocation means include:

in each input port, request means for sending a coupler allocation request message each time that a cell is received by the input port, the message being sent at the wavelength specific to the output port which is the destination of the cell and including the identifier of the input cell, in each output port, means for receiving a coupler allocation request message sent at a wavelength specific to the output port and containing the identifier of at least one requesting input port, means for deciding whether or not to allocate a coupler, and means for sending a response message containing the identifier of the allocated coupler and addressed to the requesting port, and in each input port, means for receiving a response message addressed to the input port and for controlling the switching means of the input port so as to connect it to the coupler allocated to it.

The above matrix offers high performance in terms of switching speed, even with a large number of inputs and outputs, because the coupler allocation means are distributed between all the output ports and all the input ports of the matrix. They therefore operate independently for each output port and address contention problems in a decentralized manner. There is therefore a saving in control time, which is significant when the matrix is large.

The invention will be better understood and other features of the invention will become apparent from the following description and the accompanying drawings.

BRIEF DESCRIPTION OF THE DRAWINGS

FIG. 1 shows the block diagram of a first embodiment of the matrix of the invention.

FIG. 2 shows the block diagram of a second embodiment of the matrix of the invention.

DETAILED DESCRIPTION OF THE PREFERRED EMBODIMENTS

FIG. 1 shows one example of the matrix of the invention, which has n inputs each receiving an ATM multiplex at a very high bit rate (622 Mbit/s or 2.45 Gbit/s or more) in the form of an electrical signal and n outputs each supplying an ATM multiplex at a very high bit rate in the form of an electrical signal. This embodiment comprises:

n input ports IP1, . . . , IPi, . . . IPn, a passive optical core comprising p+2 passive optical couplers $\Sigma 1, \ldots, \Sigma p, \Sigma a, \Sigma r$, p being less than or equal to n and each coupler having 2n ports, and n output ports OP1, . . . , OPj, . . . OPn each including a respective electronic buffer Q1, . . . , Qj, . . . , Qn.

Each input port, for example port IPi, includes:

an input constituting an input of the matrix, an input connected to a port of the coupler $\Sigma r$, p+1 outputs, p first outputs being connected to a respective port of each of the couplers $\Sigma 1, \ldots \Sigma p$ and the (p+1)th output being connected to a port of the coupler $\Sigma a$, a tunable light source Lid for emitting an optical signal transporting a cell received via that input of the matrix, p optical switches Si1, . . . , Sip able to route the optical signal emitted by the source Lid to at least one of the p first outputs of that input port, an optical receiver Fir tuned to a fixed wavelength specific to that input port, and a tunable light source Lia connected to the (p+1)th output.

Each output port, for example port OPj, includes:

at least p tunable optical receivers Fj1, . . . , Fjp which are tuned to the same fixed wavelength specific to that output port and each of which has an input connected to a respective port of one of the p couplers Σ1, ..., Σp, an electronic buffer Qj having p inputs respectively connected to the outputs of the p receivers Fj1, ..., Fjp and an output connected to an output of the matrix, the memory being able to receive p cells simultaneously and store them in a queue, an optical receiver Fja tuned to a fixed wavelength specific to the output port concerned, for example the same as that of the other receivers Fji, ... Fjp of the same output port, the input of this receiver Fja being connected to a port of the coupler Σa, a decision circuit Dj having an input connected to an output of the receiver Fja, and a tunable optical emitter Ljr having an input connected to an output of the decision circuit Dj and an output connected to a port of the coupler Σr.

This embodiment further includes tuning means TM for tuning the tunable light source Ll1d, ..., Lid, ..., Lnd of each of the input ports IP1, ..., IPi, ..., IPn. It receives signaling information via links that are not shown and makes the wavelength of each source Ll1d, ..., Lid, ..., Lnd equal to the wavelength specific to the output port which is the destination of the cell currently being received by the input port concerned. All the components of the matrix receive clock signals supplied by a common clock which is not shown.

If, during a given cell period, the n input ports respectively receive n (or fewer) cells respectively intended for n separate output ports, there is no collision problem. All these cells can be routed by a single optical coupler, for example coupler Σ1, because they are carried by n separate wavelengths respectively corresponding to the n output ports OP1, ..., OPj, ... OPn.

If, during a given cell period, for example, k input ports (where k is less than or equal to p) respectively receive k cells respectively intended for the same output port, those k cells cannot be routed by the same optical coupler, and it is therefore necessary to allocate a separate optical coupler to each cell. Because there are p couplers available (couplers Σ1, ..., Σp), it is possible to route p cells simultaneously to the same output port, but not more than p cells.

Depending on the permitted cell loss rate, p is made less than or equal to n. In this example, if p is less than n and k is greater than p, k-p cells are not transmitted and are therefore lost.

The couplers Σ1, ..., Σp are allocated by means distributed equally between all the input ports IP1, ..., IPi, ... IPn and all the output ports OP1, ..., OPj, ... OPn. These means include:

in input port IPi, for example: the optical receiver Fir tuned to a fixed wavelength specific to that input port and the tunable optical emitter Lia, and in output port Opj, for example: the optical receiver Fja tuned to a fixed wavelength specific to that output port, the decision circuit Dj and the tunable optical source Ljr.

If the input port IPi receives a cell intended for the output port OPj, for example, the distributed coupler allocation means operate in the following manner, in this first embodiment of the invention:

From the signaling information, the port IPi knows the destination of the cell that it receives. It uses the optical emitter Lia to send a coupler allocation request message to the output port OPj by tuning the emitter Lia to the wavelength specific to the output port OPj. To prevent allocation request messages sent during the same cell period by different input ports colliding in the coupler Σa, the messages are time-division multiplexed in a frame having n time slots, each of which can transport one bit. The frame is sent once per cell period. Each message comprises a single bit at 1 placed in a time slot specific to the input port which sends it. In other words, all the input ports which request allocation of a coupler send a bit at 1, successively during the same frame, via the coupler Σa which is reserved for transmitting this type of message.

The receiver Fja of the output port OPj receives the message and recognizes that it comes from the input port IPi because of the time position of the bit at 1 constituting the message. It transmits the identifier of the port IPi to the decision circuit Dj. It does the same for each of the messages that it then receives during the same frame, if there is more than one cell intended for the same output port. The decision circuit Dj allocates the couplers Σ1, ..., Σp in accordance with a predetermined and conventional algorithm, after reception of the allocation request message frame has ended. The algorithm defines a rotating priority for the choice of inputs, for example, with random allocation for the choice of couplers.

The output OPj then sends a series of response bits via the coupler Σr. To prevent the response bits sent during the same cell period by different output ports colliding in the coupler Σr, those bits are spectrally multiplexed by tuning the emitter Ljr successively to the respective wavelengths of the optical receivers Fir, etc. of the input ports for which those bits are intended. Each response bit indicates the identifier of a different coupler selected from couplers Σ1, ..., Σp. This series of response bits constitutes a word of p bits. The position of each bit indicates the identifier of the allocated coupler and its wavelength indicates the selected input port. The decision circuit Dj allocates the coupler Σ1 to the input port IPi for the duration of a cell period, for example. There then remain p-1 other couplers Σ2, ..., Σp which it can allocate to other input ports which have requested allocation of a coupler to transmit cells simultaneously to the same output port OPj.

Finally, the input ports concerned send their respective cells simultaneously via the couplers Σ1, ..., Σp to the output port OPj at the wavelength specific to that port OPj. Cells from other input ports for other output ports are transmitted simultaneously by the same couplers on other wavelengths.

Note that the distributed allocation means therefore operate entirely independently for the various output ports. The complexity of the control function at the level of each output port therefore does not increase in proportion to the size of the matrix.

FIG. 2 shows a second embodiment of the matrix of the invention, in which the tunable emitters L1r, ..., Ljr, ..., Lnr of the output ports are replaced by fixed wavelength emitters L1r', ..., Ljr', ..., Lnr' and the fixed wavelength receivers F1r, ..., Fir, ..., Fnr are replaced by tunable receivers F1r', ..., Fir', ..., Fnr'. The other components are unchanged. In this variant, each response is transmitted at the wavelength specific to the responding output port and each input port which has requested allocation of a coupler to the output port OPj tunes its receiver to the wavelength of that output port in order to be able to receive the expected response. Each response comprises an address on k bits, the number k being chosen to enable any one of the n input ports IP1, ..., IPn to be designated. The coupler selected is indicated by the position in time of the k-bit word.

In another embodiment, not shown, the request messages and the response messages are offset in time, and the two couplers Σa and Σr can then be one and the same.

In another embodiment, not shown, the set of n wavelengths used for the allocation requests and the set of n wavelengths used for the responses do not have any common values, in which case the couplers Σa and Σr can be one and the same.

There is claimed:

1. An ATM switching matrix having n input ports, a passive optical core and n output ports each having an electronic buffer, wherein:

each input port includes:
   an input coupled to an input of the matrix,
   at least p outputs, p being less than or equal to n,
   a tunable light source for emitting an optical signal transporting cells received at an input of the matrix,
   switching means for routing the optical signal emitted by said source to at least one of said p outputs of said input port, said matrix further includes tuning means for tuning said tunable light source of each input port so that its wavelength corresponds to the output of said matrix which is the destination of the cell currently being received by the input port concerned, said passive optical core includes at least p optical couplers each having 2n ports, n of which are respectively connected to an output of each of said n input ports, each output port includes:
   at least p optical receivers which are tuned to the same fixed wavelength which is specific to said output port, said receivers each having an input respectively connected to a port of one of said p couplers,
   a buffer having p inputs respectively connected to the outputs of said p receivers and an output connected to an output of said matrix, and said matrix includes distributed allocation means adapted to control said switching means of each input port to connect, to k separate couplers, k respective input ports which at the time concerned are receiving k cells addressed to the same output port, k being less than or equal to p, this operation being repeated for each output port.

2. The matrix claimed in claim 1 wherein said allocation means include:

in each input port, request means for sending a coupler allocation request message each time that a cell is received by said input port, said message being sent at the wavelength specific to the output port which is the destination of said cell and including the identifier of said input cell, in each output port, means for receiving a coupler allocation request message sent at a wavelength specific to said output port and containing the identifier of at least one requesting input port, means for deciding whether or not to allocate a coupler, and means for sending a response message containing the identifier of the allocated coupler and addressed to said requesting port, and in each input port, means for receiving a response message addressed to said input port and for controlling said switching means of said input port so as to connect it to the coupler allocated to it.

\* \* \* \* \*